United States Patent
Zou et al.

(10) Patent No.: US 11,640,700 B2
(45) Date of Patent: May 2, 2023

(54) METHODS AND SYSTEMS FOR RENDERING VIRTUAL OBJECTS IN USER-DEFINED SPATIAL BOUNDARY IN EXTENDED REALITY ENVIRONMENT

(71) Applicants: Changqing Zou, Markham (CA); Yumna Wassaf Akhtar, Scarborough (CA); Szu Wen Fan, Markham (CA); Jianpeng Xu, Markham (CA); Wei Li, Markham (CA)

(72) Inventors: Changqing Zou, Markham (CA); Yumna Wassaf Akhtar, Scarborough (CA); Szu Wen Fan, Markham (CA); Jianpeng Xu, Markham (CA); Wei Li, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 17/187,663

(22) Filed: Feb. 26, 2021

(65) Prior Publication Data
US 2022/0277166 A1    Sep. 1, 2022

(51) Int. Cl.
*G06V 10/25* (2022.01)
*G06F 3/01* (2006.01)
(Continued)

(52) U.S. Cl.
CPC .............. *G06V 10/25* (2022.01); *G06F 3/017* (2013.01); *G06T 19/006* (2013.01); *G06V 20/20* (2022.01); *G06V 40/28* (2022.01)

(58) Field of Classification Search
CPC ........ G06V 10/25; G06V 20/20; G06V 40/28; G06F 3/017; G06T 19/006
See application file for complete search history.

(56) References Cited

U.S. PATENT DOCUMENTS

| | | | |
|---|---|---|---|
| 7,483,057 B2* | 1/2009 | Grosvenor | H04N 9/0451 348/239 |
| 7,995,076 B2* | 8/2011 | Emam | G06T 3/00 345/631 |

(Continued)

FOREIGN PATENT DOCUMENTS

| | | |
|---|---|---|
| CN | 108701352 A | 10/2018 |
| CN | 111862340 A | 10/2020 |

(Continued)

OTHER PUBLICATIONS

Wither et al., Annotation in outdoor augmented reality, Computers & Graphics 2009, pp. 679-689 (Year: 2009).*

(Continued)

*Primary Examiner* — Motilewa Good-Johnson

(57) ABSTRACT

Methods and systems for rendering a virtual overlay in an extended reality (XR) environment are described. Image data is received, representing a current field of view (FOV) in the XR environment. A spatial boundary is defined in the current FOV, based on user input. An image label representing a region of interest (ROI) within the defined spatial boundary, and one or more object labels representing one or more objects within the defined spatial boundary are generated. At least one relevant virtual object is identified. The virtual object is relevant to a semantic meaning of the ROI based on the image label and/or the one or more object labels. Identification of the at least one relevant virtual object is outputted, to be renderable in the XR environment.

18 Claims, 10 Drawing Sheets

(51) Int. Cl.
*G06T 19/00* (2011.01)
*G06V 20/20* (2022.01)
*G06V 40/20* (2022.01)

(56) References Cited

U.S. PATENT DOCUMENTS

| | | | |
|---|---|---|---|
| 8,558,759 B1* | 10/2013 | Prada Gomez | G06F 3/017 |
| | | | 345/619 |
| 8,687,021 B2 | 4/2014 | Bathiche et al. | |
| 9,024,842 B1* | 5/2015 | Prada Gomez | G06F 3/017 |
| | | | 345/619 |
| 9,076,033 B1* | 7/2015 | Barron | G06F 3/011 |
| 9,589,372 B1 | 3/2017 | Bean et al. | |
| 10,133,342 B2* | 11/2018 | Mittal | G06F 3/04842 |
| 10,755,128 B2* | 8/2020 | Turkelson | G06V 10/44 |
| 10,909,405 B1* | 2/2021 | Golard | G06V 10/82 |
| 11,023,730 B1* | 6/2021 | Zhou | G06V 10/25 |
| 11,210,863 B1* | 12/2021 | Yan | G06T 19/20 |
| 11,367,250 B2* | 6/2022 | Totty | G06T 15/205 |
| 2009/0110235 A1* | 4/2009 | Marti | G06F 3/04842 |
| | | | 382/103 |
| 2010/0199232 A1* | 8/2010 | Mistry | G06F 3/0426 |
| | | | 715/863 |
| 2012/0019557 A1* | 1/2012 | Aronsson | G06T 11/00 |
| | | | 345/633 |
| 2012/0092369 A1* | 4/2012 | Kim | G06T 19/006 |
| | | | 345/633 |
| 2013/0021374 A1* | 1/2013 | Miao | G06F 3/017 |
| | | | 345/633 |
| 2014/0078175 A1* | 3/2014 | Forutanpour | G06F 3/012 |
| | | | 345/633 |
| 2019/0102922 A1* | 4/2019 | Gum | G01C 21/206 |
| 2019/0188895 A1 | 6/2019 | Miller, IV et al. | |
| 2019/0340649 A1 | 11/2019 | Ayush et al. | |
| 2020/0342668 A1 | 10/2020 | Chojnacka et al. | |
| 2021/0042993 A1* | 2/2021 | Tagra | G06T 7/50 |
| 2022/0103748 A1* | 3/2022 | Canberk | H04N 5/23293 |
| 2022/0269895 A1* | 8/2022 | Barkan | G06V 20/64 |

FOREIGN PATENT DOCUMENTS

| | | |
|---|---|---|
| CN | 112219205 A | 1/2021 |
| WO | 2009101577 A2 | 8/2009 |

OTHER PUBLICATIONS

Tonnis et al., Representing information—Classifying the Augmented Reality presentation space, Computers & Graphics 2013, pp. 997-1011 (Year: 2013).*
Y. S. Chang, B. Nuernberger, B. Luan, and T. Hollerer. "Evaluating gesture-based augmented reality annotation." In 2017 IEEE Symposium on 3D User Interfaces (3DUI), pp. 182-185, Mar. 2017. doi: 10. 1109/3DUI.2017.7893337.
Steven N. Bathiche, Jon Marcus Randall Whitten, John Mark Miller et al. "Augmented Reality and Filtering." U.S. Pat. No. 8687021B2.

* cited by examiner

METHODS AND SYSTEMS FOR RENDERING VIRTUAL OBJECTS IN USER-DEFINED SPATIAL BOUNDARY IN EXTENDED REALITY ENVIRONMENT

FIELD

The present disclosure relates to methods and systems for human interaction with an electronic device, including supporting the use of a user-defined spatial boundary in an extended reality environment and rendering recommended virtual objects relevant to the bounded space.

BACKGROUND

Extended reality (XR) is an umbrella term that is intended to cover different technologies in which a human user is provided with at least some sensory inputs (e.g., visual display, audio sounds, tactile feedback, etc.) that are virtual (i.e., generated by a computing system and not necessarily reflective of the user's real physical environment). XR covers technologies including virtual reality (VR), augmented reality (AR) and mixed reality (MR). XR thus covers technologies in which a user interacts with an environment that is entirely computer-generated (e.g., VR) as well as technologies in which a user interacts with an environment that has virtual and real-world components (e.g., AR or MR). The virtual environment may be referred to as a scene.

Many existing AR applications involve the user only as a passive consumer of the AR environment (e.g., viewing virtual objects or virtual information displays overlaid on a view of the physical environment). There is interest in expanding the user experience to include active user interactions with the AR environment. For example, a useful user interaction with an XR environment (including AR environment) is the ability to add virtual objects onto the XR environment. However, it may be difficult for a user to identify and select what virtual objects are suitable and relevant to be added into the XR environment. For example, an XR system may have access to a vast library of virtual objects, and it may be difficult (e.g., time-consuming and/or tedious) for a user to identify and select virtual objects that are relevant to their current XR environment. Further, existing AR applications typically do not take into account the user's specific point of focus, making it difficult or impossible for a user to identify and select a virtual object suitable for the AR environment.

Accordingly, it would be useful to provide methods and systems for more effective selection and rendering of virtual objections to be added to an XR environment.

SUMMARY

The disclosed methods and systems address at least the problem that many existing AR systems are unable to provide users with suggestions or recommendations of what virtual object may be relevant to a user's specific point of focus. Other problems addressed by the present disclosure will be apparent in the context of the detailed description.

In various examples, the present disclosure describes methods and systems that enable users of an electronic device to define a spatial boundary in the XR environment, through the use of gestures and/or virtual viewfinder. The spatial boundary defines a region of interest in a current field of view. The electronic device performs image classification and object recognition within the region of interest, which enables identification of virtual objects relevant to the semantic meaning of the region of interest. The user may then be presented with a recommendation of one or more relevant virtual objects to be rendered as an overlay in the region of interest.

In various examples, the present disclosure describes methods and systems that enable a user to interact with an XR environment (e.g., an AR environment) more intuitively and/or more efficiently. The use of the disclosed methods and systems may enable a user to identify and select a virtual object to be added to the XR environment, using fewer steps and/or using fewer memory and processing resources of the electronic device. For example, the user may be presented with only recommended virtual objects that are relevant to the semantic meaning of a user-defined ROI in the FOV, rather than the user having to access and search through a vast digital library of all possible virtual objects. The user of a user-defined spatial boundary also enables more efficient use of memory and processing resources of the electronic device, because the analysis to determine the semantic meaning of the ROI and to identify the relevant virtual objects may be limited to only the ROI within the defined spatial boundary, rather than the entire scene in the FOV. Other such technical advantages of the present disclosure will be understood by those skilled in the art.

Examples of the present disclosure may be implemented in XR-capable systems, including XR-dedicated devices (e.g., AR systems, VR systems and/or MR systems), as well as general purpose devices such as handheld devices (e.g., smartphone, tablets, etc.), wearable devices (e.g., AR glasses, smart watch, smart ring, etc.), and/or desktop computing devices. Any electronic device that is capable of rendering a virtual object in an XR environment may benefit from the examples of the present disclosure.

In some example aspects, the present disclosure describes a method for rendering a virtual overlay in an extended reality (XR) environment. The method includes: obtaining image data representing a current field of view (FOV) in the XR environment; defining a spatial boundary in the current FOV, based on user input; generating an image label representing a region of interest (ROI) within the defined spatial boundary; generating one or more object labels identifying respective one or more objects within the defined spatial boundary; identifying at least one relevant virtual object that is relevant to a semantic meaning of the ROI based on at least one of: the image label and the one or more object labels; and outputting identification of the at least one relevant virtual object to be renderable in the XR environment.

In any of the preceding examples, defining the spatial boundary in the current FOV may include: displaying a virtual viewfinder in the current FOV, the virtual viewfinder representing a spatial boundary shape enclosing a portion of the current FOV; and in response to the user input, defining the spatial boundary in the current FOV using the virtual viewfinder.

In any of the preceding examples, defining the spatial boundary in the current FOV may include: performing gesture recognition on the image data to identify a gesture input; identifying a spatial boundary shape corresponding to the identified gesture input; and defining the spatial boundary in the current FOV using the identified spatial boundary shape.

In any of the preceding examples, the image data may include a sequence of frames, and the gesture recognition may be performed to identify a dynamic gesture input over a plurality of frames.

In any of the preceding examples, the image data may include one or more frames, and the gesture recognition may be performed to identify a static gesture input in at least one frame.

In any of the preceding examples, defining the spatial boundary in the current FOV may include: receiving touch input; identifying a spatial boundary shape corresponding to the touch input; and defining the spatial boundary in the current FOV using the identified spatial boundary shape.

In any of the preceding examples, the spatial boundary shape may be identified corresponding to a path travelled by the touch input.

In any of the preceding examples, the method may include: rendering the at least one relevant virtual object in the ROI within the defined spatial boundary.

In any of the preceding examples, a plurality of relevant virtual objects may be identified, and the method may include: receiving a selection of one relevant virtual object from the plurality of relevant virtual objects; and rendering the one relevant virtual object in the ROI within the defined spatial boundary.

In any of the preceding examples, outputting the identification of the plurality of relevant virtual objects may include ranking the plurality of relevant virtual objects based on relevance to the semantic meaning of the ROI.

In some example aspects, the present disclosure describes an electronic device including a processing unit coupled to a memory storing machine-executable instructions thereon. The instructions, when executed by the processing unit, cause the electronic device to: receive image data representing a current field of view (FOV) in the XR environment; define a spatial boundary in the current FOV, based on user input; generate an image label representing a region of interest (ROI) within the defined spatial boundary; generate one or more object labels identifying respective one or more objects within the defined spatial boundary; identify at least one relevant virtual object that is relevant to a semantic meaning of the ROI based on at least one of: the image label and the one or more object labels; and output identification of the at least one relevant virtual object to be renderable in the XR environment.

In some example aspects, the present disclosure describes a non-transitory computer-readable medium having machine-executable instructions stored thereon. The instructions, when executed by a processing unit of an electronic device, cause the electronic device to: receive image data representing a current field of view (FOV) in the XR environment; define a spatial boundary in the current FOV, based on detected user input; generate an image label representing a region of interest (ROI) within the defined spatial boundary; generate one or more object labels identifying respective one or more objects within the defined spatial boundary; identify at least one relevant virtual object that is relevant to a semantic meaning of the ROI based on at least one of: the image label and the one or more object labels; and output identification of the at least one relevant virtual object to be renderable in the XR environment.

In any of the preceding examples, the instructions, when executed by the processing unit, may cause the electronic device to perform any of the methods described above.

In any of the preceding examples, the electronic device may be a head-mounted display (HMD) device, augmented reality (AR) glasses, a wearable device, or a handheld device.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1A:
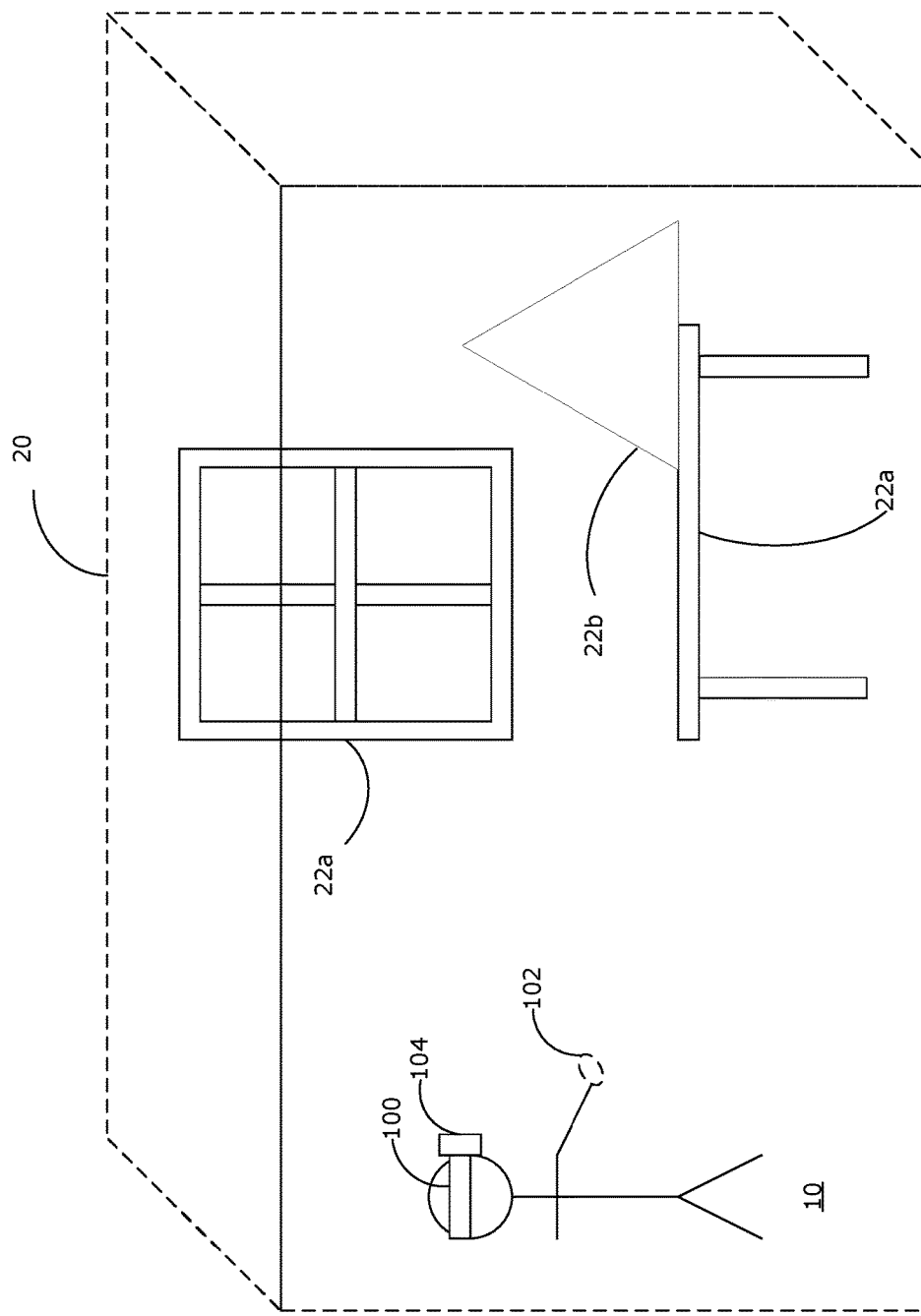
FIG. 1A is a simplified diagram illustrating a user interacting with an example XR environment using a wearable electronic device.

In various examples, the present disclosure describes methods and systems related to user interactions in extended reality (XR) environments. The disclosed examples may be used for defining a spatial boundary in an XR environment, and identifying one or more virtual objects that can be overlaid on the XR environment, based on the content the bounded region. Examples of the present disclosure may be implemented in XR-dedicated devices, including augmented reality (AR) devices, virtual reality (VR) devices, or mixed reality (MR) devices. Examples of the present disclosure may also be implemented in general purpose (i.e., not necessarily dedicated to XR) electronic devices. Examples of suitable electronic devices (which may or may not be XR-dedicated) include wearable devices (e.g., head-mounted display (HMD) devices, AR glasses, smart watches, smart rings, etc.) and/or handheld devices (e.g., smartphones, tablets, etc.), among others. Examples of the present disclosure may also be implemented in non-wearable devices, such as desktop computing devices, laptop computing devices, workstations, tracking systems, and other computing devices. Other devices may be used to implement examples of the present disclosure.

As previously mentioned, a challenge with generating virtual overlays in AR environments is that a user may have difficulty in identifying and selecting a suitable virtual object to overlay into the AR environment. Some existing solutions rely on location information (e.g., using simultaneous localization and mapping (SLAM) or global positioning system (GPS) sensors) to identify location-relevant virtual objects to overlay into the AR environment. However, such the location-relevant virtual objects are typically predefined and do not enable a user to select a virtual object to add to the AR environment. Further, such solutions typically do not provide a way for a user to exclude location-relevant information that is not of interest. For example, an AR map software may display location identifiers for all landmarks within a user's field-of-view (FOV), which may result in a cluttered view and the user being overwhelmed with information.

Other existing solutions may enable a user to add a virtual object to an XR environment, but typically are not context-aware and do not help the user to select a virtual object that is suitable to the XR environment. For example, a user may need to search through a digital library of all available virtual objects to find and select a suitable virtual object. This is a tedious process. Further, an inexperienced user may not know which virtual objects are available in the digital library, with the result that the user searches in vain for a virtual object that is not available or ends up selecting a less suitable virtual object.

The present disclosure describes methods and systems that help to address at least some of the above problems. The disclosed methods and systems enable users of an electronic device to define a closed spatial boundary in the XR environment, using gestures and/or a virtual viewfinder. The user may use static and/or dynamic hand gestures to define a boundary in a FOV. The user may also use touch gestures to draw a boundary on a touchscreen. The user may also define a virtual viewfinder in the FOV to define a boundary. The spatial boundary defines a region of interest (ROI) which is processed by the electronic device, using object recognition and image classification (e.g., using an artificial intelligence (AI) algorithm), to determine the semantic meaning of the ROI. The electronic device then recommends one or more virtual objects, which are relevant to the semantic meaning of the ROI, that can be selected to be overlaid into the XR environment.

In the context of the present disclosure, a virtual object is considered to be "suitable" or "relevant" to a ROI in the XR environment if the virtual object has a label that is related to the semantic meaning of the image label for the ROI and/or related to the semantic meaning of the object label for one or more objects recognized in the ROI. For example, the electronic device may use a natural language processing (NLP) algorithm to determine object labels that are relevant to the image label and/or object label of the ROI. The relevant object labels may then be used to identify a relevant virtual object from a digital library.

In the context of the present disclosure, a virtual object that "overlays" or is "overlaid" in the XR environment may visually obscure at least part of a background or other object in the XR environment. For example, in an AR environment, a virtual object may overlay a non-virtual object such that the virtual object completely blocks the user's view of the non-virtual object (thus completely replacing the non-virtual object in the user's FOV) or partially blocks the user's view of the non-virtual object (thus appearing to sit on top of or be part of the non-virtual object in the user's FOV).

A virtual object in the present disclosure may be a static object or a dynamic object (e.g., the virtual object may change positions in the XR environment and/or may change pose and/or shape). A virtual object may be a two-dimensional (2D) or three-dimensional (3D) visual object. A virtual object may include an audio component (e.g., sounds that are relevant to the virtual object).

Figure 1B:
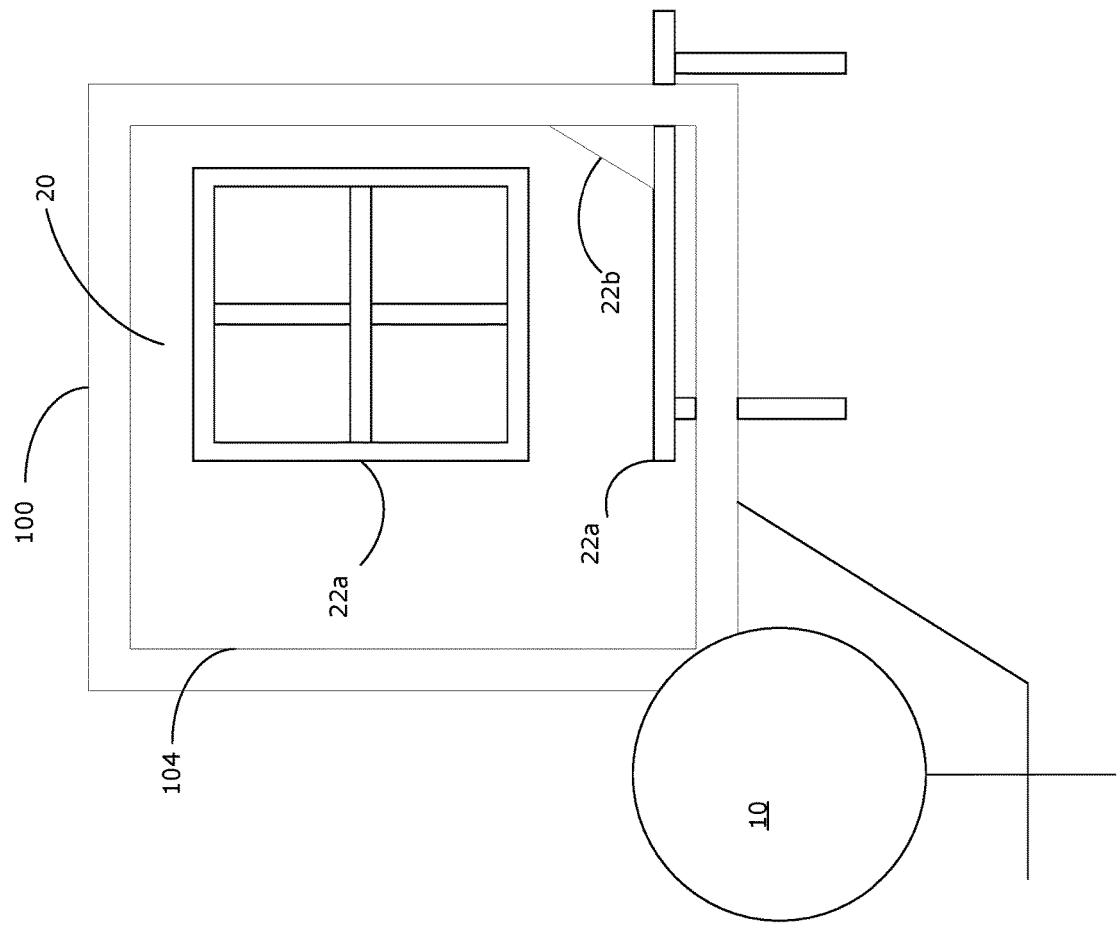
FIG. 1B is a simplified diagram illustrating a user interacting with an example XR environment using a non-wearable electronic device.

FIG. 1A shows an example of a user 10 interacting with an XR environment 20 (also referred to as an XR scene). In this example, the XR environment 20 is generated by an electronic device 100 that is a wearable device such as a set of AR glasses. In other examples (e.g., as shown in FIG. 1B), the XR environment 20 may be generated by a non-wearable electronic device 100 (e.g., a handheld device).

It should be noted that the XR environment 20 is virtual or at least partially virtual. That is, the XR environment 20 may include virtual objects 22b that are not in the actual physical environment of the user 10, and may also include non-virtual objects 22a (e.g., where the XR environment 20 is an AR environment). Non-virtual objects 22a (also referred to as physical objects or real-world objects) and virtual objects 22b may generally be referred to as objects 22. In this simplified diagram, the XR environment 20 includes a plurality of non-virtual objects 22a for which a virtual object 22b may be rendered and overlaid. If the XR environment 20 is an AR environment, the XR environment 20 may include a non-virtual background (e.g., including walls, windows, furniture, real-world buildings, trees, streetscape, etc.), which may also be or include non-virtual objects 22a.

The XR environment 20 may be viewed by the user 10 via a display 104 coupled to or integrated with the electronic device 100. The display 104 may provide an immersive view of the XR environment 20 (e.g., providing a field-of-view (FOV) ranging from 40 to 110 degrees) when the display 104 is part of a wearable electronic device 100 as shown in FIG. 1A, or a more restricted view of the XR environment 20 (e.g., a display 104 of a handheld electronic device 100 may provide a moveable viewport for displaying portions of the XR environment 20, as shown in FIG. 1B). The display 104 may be a high resolution organic light-emitting diode (OLED) display or liquid crystal display (LCD), for example. In some examples, the display 104 may be capable of displaying stereoscopic graphics (e.g., the display 104 displays separate stereoscopic graphics to the left and the right eyes), and the XR environment 20 may be an immersive 3D environment. The electronic device 100 may include a camera (not shown in FIG. 1A) capable of capturing a FOV of a non-virtual environment (which may be part of the XR environment 20, for example in AR applications). The camera may also be capable of capturing video images of a hand of the user 10, when the hand is within the FOV of the camera.

As discussed further below, the user 10 may use hand gestures and/or head pose to define a spatial boundary in the XR environment 20. Hand gestures may be captured within the FOV of the camera, for example. Head pose may include the position of the head (e.g., defined by (x, y, z) Cartesian coordinate position in a frame of reference of the XR environment 20) and may also include the orientation of the head (e.g., defined by Euler angles in the frame of reference of the XR environment 20). Head pose may be detected using a sensor (e.g., accelerometer, gyroscope, magnetometer, inertial measurement unit (IMU), etc.) of the wearable electronic device 100.

In some examples, hand gestures and/or head pose may be captured using an external tracking system (e.g., an infrared tracking system, or computer vision-based tracking system; not shown in FIG. 1A) capable of detecting and tracking motion of the user 10 and communicating tracking data to the electronic device 100. Optionally, the electronic device 100 may be coupled to a controller 102 that may be handheld (e.g., a specialized device, or a general handheld device such as a smartphone) or wearable (e.g., a smartwatch or smart ring). The optional controller 102 may be used to enable the electronic device 100 to detect hand gestures (e.g., the controller 102 may include a motion sensor, such as an accelerometer, gyroscope, magnetometer, IMU, etc.). The optional controller 102 may provide other input mechanisms (e.g., a button, joystick, touchpad, etc.) to enable the user 10 to provide input to the electronic device 100. The optional controller 102 may additionally or alternatively have a passive or active trackable marker to enable tracking of the controller 102 (and thus tracking of the hand of the user 10) by the external tracking system. Various techniques and technologies may be used to track the hands and head of the user 10, and it should be understood that the present disclosure is not intended to be limited the specific tracking methods described.

FIG. 1B shows an example of the user 10 interacting with the XR environment 20 where the XR environment 20 is generated by an electronic device 100 that is a handheld device such as a smartphone.

In this example, the XR environment 20 is an AR environment, including non-virtual objects 22a and virtual objects 22b. For example, a camera (not shown in FIG. 1B) of the electronic device 100 may capture a view of the non-virtual environment (including one or more non-virtual objects 22a), which is displayed to the user 10 together with one or more rendered virtual objects 22b. As illustrated in FIG. 1B, a virtual object 22b may be only partially rendered in the XR environment 20 if the virtual object 22b is only partially inside the current FOV. The user 10 may move the electronic device 100 to view different portions of the XR environment 20 (e.g., in the manner of moving a viewport). A sensor (e.g., accelerometer, gyroscope, magnetometer, IMU, global positioning system (GPS) unit, etc.) of the electronic device 100 may detect the pose of the electronic device 100 to enable the electronic device 100 to render the virtual objects 22b corresponding to the current view of the non-virtual environment.

As discussed further below, the user 10 may use hand gestures, touch gestures and/or a virtual viewfinder to define a spatial boundary in a current FOV in the XR environment 20. Hand gestures may be captured within the FOV of the camera, for example. Touch gestures may be detected by a touch-sensitive component (e.g., touchscreen) of the electronic device 100. The virtual viewfinder may be controlled by changing the device pose to capture different FOVs. Device pose may include the position of the electronic device 100 (e.g., defined by (x, y, z) Cartesian coordinate position in a real-world frame of reference) and may also include the orientation of the electronic device 100 (e.g., defined by Euler angles in the real-world frame of reference).

In some examples, hand gestures and/or device pose may be captured using an external tracking system, similar to that discussed above with respect to FIG. 1A. Various techniques and technologies may be used to track the hands of the user 10 and the electronic device 100, and it should be understood that the present disclosure is not intended to be limited the specific tracking methods described.

FIGS. 1A and 1B illustrate some example electronic devices 100 and XR environments 20 in which examples of the present disclosure may be implemented. However, it should be understood that the present disclosure is not intended to be limited to such examples.

Figure 2:
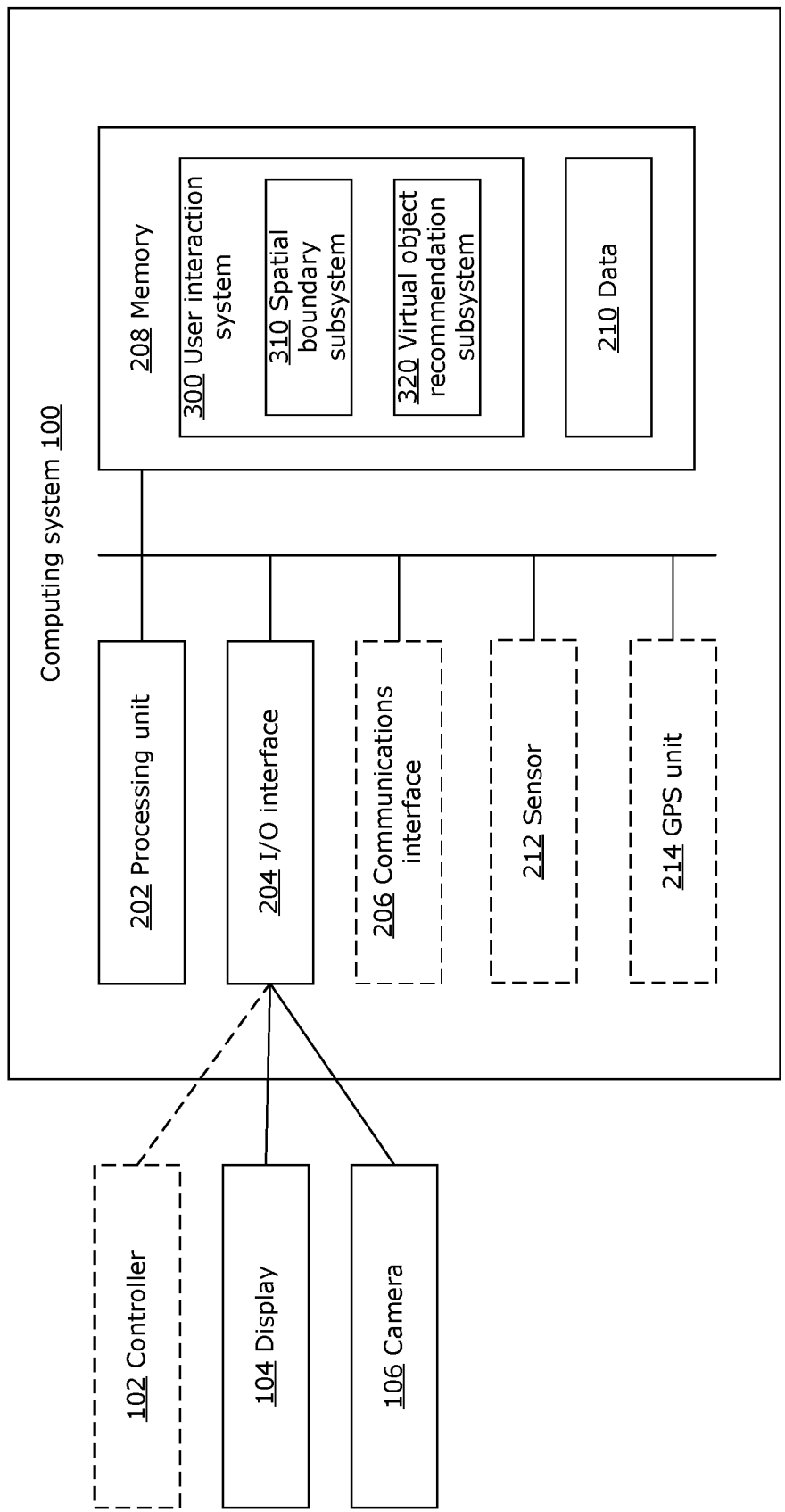
FIG. 2 is a block diagram illustrating some components of an example electronic device, in accordance with examples of the present disclosure.

FIG. 2 is a block diagram showing some components of an example embodiment of the electronic device 100 which may be used to implement examples disclosed herein. Although an example embodiment of the electronic device 100 is shown and discussed below, other embodiments may be used to implement examples disclosed herein, which may include components different from those shown. Although FIG. 2 shows a single instance of each component, there may be multiple instances of each component shown.

The electronic device 100 may be a wearable device (e.g., a head-mounted display (HMD) device, AR glasses, etc.), a handheld or mobile device (e.g., a smartphone, tablet, laptop device, etc.), or a non-mobile device (e.g., such as a desktop computing device, workstation, tracking system, etc.), among others. In some examples, the electronic device 100 may be a non-wearable device that communicates with a wearable device (e.g., the display 104 may be a wearable device coupled to a non-mobile electronic device 100, and the non-mobile electronic device 100 may render the XR environment 20 for output by the wearable display 104). Examples of the present disclosure may be implemented in any suitable electronic device that is capable of rendering virtual objects in the XR environment 20, for example.

The electronic device 100 includes at least one processing unit 202, such as a processor, a microprocessor, an application-specific integrated circuit (ASIC), a field-programmable gate array (FPGA), a dedicated logic circuitry, a graphics processing unit (GPU), a central processing unit (CPU), a dedicated artificial intelligence processor unit, or combinations thereof. The electronic device 100 also includes at least one input/output (I/O) interface 204, which interfaces with input devices such as a camera 106 and the optional controller 102, and output devices such as the display 104. The electronic device 100 may include other input devices (e.g., buttons, microphone, touchscreen, keyboard, etc.) and other output devices (e.g., speaker, vibration unit, etc.). The optional controller 102, camera 106 and the display 104 may be external to the electronic device 100, as illustrated in FIG. 2. In other examples, the optional controller 102, camera 106 and/or the display 104 may be integrated with the electronic device 100 (e.g., the electronic device 100 may be a HMD device or AR glasses with a built-in display 104 and camera 106, or a handheld device with integrated display 104 and camera 106).

The electronic device 100 may include an optional communications interface 206 for wired or wireless communication with an external system or network (e.g., an intranet, the Internet, a P2P network, a WAN and/or a LAN). The communications interface 206 may enable communication using wired links (e.g., Ethernet, etc., using one or more cables) and/or wireless links (e.g., Wi-Fi, Bluetooth, etc., using one or more antennas) for intra-network and/or inter-network communications. The communications interface 206 may enable the electronic device 100 to communicate with an external system, such as an external tracking system, to receive input data (e.g., tracking data representing the position and/or shape of hands of the user 10).

The electronic device 100 includes at least one memory 208, which may include a volatile or non-volatile memory (e.g., a flash memory, a random access memory (RAM), and/or a read-only memory (ROM)). The non-transitory memory 208 may store instructions for execution by the processing unit 202, such as to carry out examples described in the present disclosure. For example, the memory 208 may include instructions for executing a user interaction system 300, including a spatial boundary subsystem 310 and a virtual object recommendation subsystem 320, discussed further below. The memory 208 may include other software instructions, such as for implementing an operating system, rendering the XR environment 20 and other applications/ functions. The memory 208 may also include data 210, such as data representing virtual objects that can be rendered in the XR environment 20.

In some examples, the electronic device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive or cloud storage in wired or wireless communication with the electronic device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The electronic device 100 may optionally include at least one sensor 212, which may include an accelerometer, a gyroscope, a magnetometer, an IMU (which may be a combination of accelerometer, gyroscope and/or magnetometer), among others. The sensor 212 may sense the pose of the electronic device 100 (and by extension the head of the user 10 if the electronic device 100 is designed to be worn on the head) and generate sensor data representing the device pose. In some examples the sensor(s) 212 may also include an eye tracking unit (e.g., an optical eye-tracking sensor) that senses rotation of the eyes of the user 10 and generates sensor data representing the direction (e.g., in three DOF) of the eyes. The electronic device 100 may also include an optional GPS unit 214, which may communicate with a global navigation system (e.g., via the communications interface(s) 206) to generate data representing the device pose.

Figure 3:
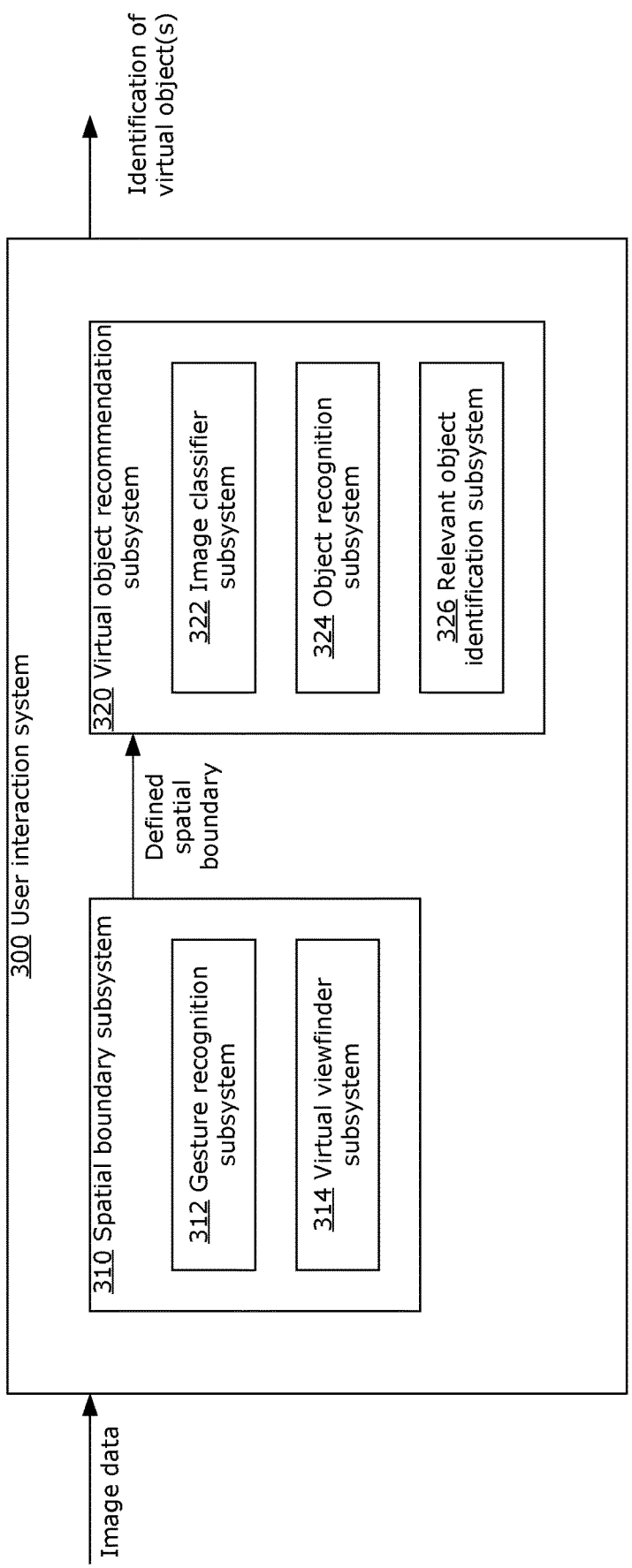
FIG. 3 is a block diagram of an example user interaction, in accordance with examples of the present disclosure.

FIG. 3 is a block diagram illustrating some example subsystems of the user interaction system 300. As discussed further below, the user interaction system 300 may be executed by the electronic device 100 to enable a user to define a spatial boundary in the XR environment 20, and to identify one or more virtual objects that a user may select to add as an overlay to the XR environment 20. The user interaction system 300 may also enable other user interactions with the XR environment 20. In some examples, other user interactions may be enabled by executing other systems of the electronic device 100.

In this example, the user interaction system 300 may be implemented using the spatial boundary subsystem 310 and the virtual object recommendation subsystem 320. In this example, the spatial boundary subsystem 310 includes a gesture recognition subsystem 312 and a virtual viewfinder subsystem 314. In this example, the virtual object recommendation subsystem 320 includes an image classifier subsystem 322, an object recognition subsystem 324 and a relevant object identification subsystem 326. Although FIG. 3 illustrates distinct subsystems within the user interaction system 300, this is not intended to be limiting. The operations of the user interaction system 300, as disclosed herein, may be implemented using greater or fewer number of subsystems. Functions described as being performed using a particular one of the subsystems may be performed by a different one of the subsystems. In some examples, the user interaction system 300 may not include any distinct subsystems. Instead, the functions of the subsystems may be considered functions of the overall user interaction system 300.

The user interaction system 300 receives or obtains image data as input. The image data may be, for example, one or more frames of a live video image captured by the camera 106 of the electronic device 100. The image data captures a current FOV of the XR environment 20. The user interaction system 300 may also receive or obtain addition sensor data, depending on the manner in which the spatial boundary is defined by the user. For example, if static or dynamic hand gestures within the FOV are used to define the spatial boundary, the image data may be sufficient to define the spatial boundary. In another example, if touch gestures on a touchscreen of the electronic device 100 are used to define the spatial boundary, touch sensor data may be received and processed to define the spatial boundary. In another example, if a virtual viewfinder in the FOV is used to define the spatial boundary, the image data may be sufficient to define the spatial boundary.

The user interaction system 300 outputs an identification of a virtual object, which may be used by a XR software application to render the virtual object as an overlay in the XR environment 20 or to offer the user 10 the option of selecting the virtual object to be rendered in the XR environment 20. The identification of the virtual object may, for example, be a label, pointer, or other identifier of one of a plurality of available virtual objects that are stored in a digital library (e.g., a digital library that is maintained locally by the electronic device 100, or a remote digital library that is accessible by the electronic device 100). A digital library may be, for example, a virtual object database local or remote to the electronic device 100. In some examples, the user interaction system 300 may output an identification of a plurality of virtual objects. The plurality of virtual objects may be ranked by order of recommendation, for example.

The spatial boundary subsystem 310 is used to define a spatial boundary in the XR environment 20. The gesture recognition subsystem 312 is used to detect gestures (e.g., hand gestures and/or touch gestures) to define the spatial boundary. For example, the image data may be processed by the gesture recognition subsystem 312 to recognize a static or dynamic hand gesture defining a spatial boundary in the current FOV. The gesture recognition subsystem 312 may include or may be adapted from existing hand tracking algorithms that use machine vision or other image processing techniques to recognize user gestures (e.g., for common user interactions such as menu navigation or object manipulation). The gesture recognition subsystem 312 may, for example, implement a trained classifier (e.g., implemented using a neural network) to detect gesture corresponding to a defined shape. The detected gesture may be a static gesture in which the shape of the hand(s) is mapped to a spatial boundary shape (e.g., two hands forming a triangular shape may be mapped to a triangular boundary; two hands framing a rectangular shape may be mapped to a rectangular boundary; two hands forming a heart shape may be mapped to a heart-shaped boundary; etc.). The detected gesture may also be a dynamic gesture in which the motion of the hand(s) (possibly together with the shape of the hand(s)) is mapped to a spatial boundary shape (e.g., a hand drawing a triangular shape may be mapped to a triangular boundary; a hand drawing a rectangular shape may be mapped to a rectangular boundary; a hand drawing a heart shape may be mapped to a heart-shaped boundary; etc.).

The gesture recognition subsystem 312 may additionally or alternatively be used to recognize a touch gesture to define the spatial boundary. For example, sensor data representing touch input may be processed by the gesture recognition subsystem 312 to recognize a touch gesture defining a spatial boundary. The gesture recognition subsystem 312 may include or may be adapted from existing touch recognition algorithms that use touch gestures for common user interactions such as menu navigation or drawing. The gesture recognition subsystem 312 may, for example, detect the path of the touch input and map the detected path to a particular boundary shape (e.g., rectangle, triangle, circle, heart, etc.). For example, touch input that travels a circular path may be mapped to a circular boundary.

In addition to the gesture recognition subsystem 312, or as an alternative to the gesture recognition subsystem 312, the virtual viewfinder subsystem 314 may be used to define a spatial boundary by using the display 104 as a virtual viewfinder. For example, a default or user-selected shape may be displayed as a viewfinder on the display 104. The virtual viewfinder may restrict or focus the user's view to the portion of the FOV enclosed by the virtual viewfinder (e.g., portions of the display 104 outside of the virtual viewfinder may be blurred out). The user 10 may move the virtual viewfinder (e.g., by moving the head if the display 104 is integrated on a head-worn electronic device 100; or by moving a handheld electronic device 100 with integrated display 104) to change the FOV until the desired ROI is within the virtual viewfinder. Additional user input may be used to confirm the selection of the virtual viewfinder as the defined spatial boundary. Using the virtual viewfinder subsystem 314 may enable the user 10 to define the spatial boundary without the use of hand gestures.

The user 10 may be provided with the option to define a spatial boundary using gestures or using a virtual viewfinder. The spatial boundary subsystem 310 may use the gesture recognition subsystem 312 or the virtual viewfinder subsystem 314, as appropriate, depending on the user selection.

The spatial boundary is defined relative to the current FOV. For example, the spatial boundary may be mapped to the frame of reference of the current FOV. The spatial boundary that is outputted by the spatial boundary subsystem 310 may be represented using coordinates in the frame of reference of the FOV. For example, if the spatial boundary is a rectangular shape, the spatial boundary subsystem 310 may output the coordinates of the four vertices of the rectangular spatial boundary. The spatial boundary may be represented in other ways, for example depending on the shape of the spatial boundary.

The spatial boundary, defined using the spatial boundary subsystem 310, may be used to render a visual representation of the spatial boundary on the display 104. This may enable the user 10 to confirm whether the spatial boundary is defined correctly (e.g., the user 10 can view whether the desired ROI is encompassed by the defined spatial boundary). Optionally, after the spatial boundary is displayed to the user 10, the user 10 may be provided with options to modify the displayed spatial boundary. For example, the user 10 may use commonly recognized gestures to change the size, location, orientation, etc. of the displayed spatial boundary.

The spatial boundary (after applying any optional modifications by the user) is provided to the virtual object recommendation subsystem 320. The virtual object recommendation subsystem 320 performs both image classification (using the image classifier subsystem 322) and object recognition (using object recognition subsystem 324) to generate an image label and object label(s) for the ROI defined by the spatial boundary. The semantic meaning of the ROI may be determined based on the image label and/or object label(s). The relevant object identification subsystem 326 is then used to identify one or more virtual objects (from a digital library of visual objects) relevant to the semantic meaning of the ROI.

The image classifier subsystem 322 may be implemented using any suitable classifier, including AI image classification algorithms (e.g., using a trained neural network). For example, a convolutional neural network (CNN) may be trained to perform image classification. Examples of suitable CNNs that may be used for the image classifier subsystem 322 include AlexNet, Inceptionv3, and VGG, among other possibilities. Image classification takes into consideration all elements within the spatial boundary, including objects (that may be further detected and recognized by the object recognition subsystem 324) and background. The image classifier subsystem 322 performs image classification in the ROI (defined in the FOV by the spatial boundary), and outputs at least one image label. The image label represents the environment in the ROI (e.g., a label representing the scene, such as "street", "night", "forest", etc.).

The object recognition subsystem 324 may be implemented using any object recognition algorithm, including AI object detection and recognition algorithms (e.g., using a trained neural network, different from that used in the image classifier subsystem 322). For example, a CNN or region-based CNN may be trained to perform image segmentation and object detection. Examples of suitable CNNs that may be used for the image classifier subsystem 322 include AlexNet, Inceptionv3, and VGG, among other possibilities. Object detection and recognition is used to identify individual objects within the spatial boundary. The object recognition subsystem 324 performs object detection and recognition in the ROI (defined in the FOV by the spatial boundary), and outputs a respective object label for each detected object. The object label represents an object class for each object.

The image label and the object label(s), generated by the image classifier subsystem 322 and the object recognition subsystem 324, are provided to the relevant object identification subsystem 326. The relevant object identification subsystem 326 uses the semantic meaning of the ROI (based on at least one of the image label or object label(s)) to identify one or more relevant virtual objects from the digital library. For example, the relevant object identification subsystem 326 may use NLP algorithms to generate object label(s) relevant to the semantic meaning of the ROI. The relevant object label(s) may be used to query the digital library to identify one or more relevant virtual object(s) from the digital library. The relevant virtual object(s) may each be identified by an identifier (e.g., an object number or other reference), and the identifier(s) of the relevant virtual object(s) are outputted by the user interaction system 300.

Figure 4:
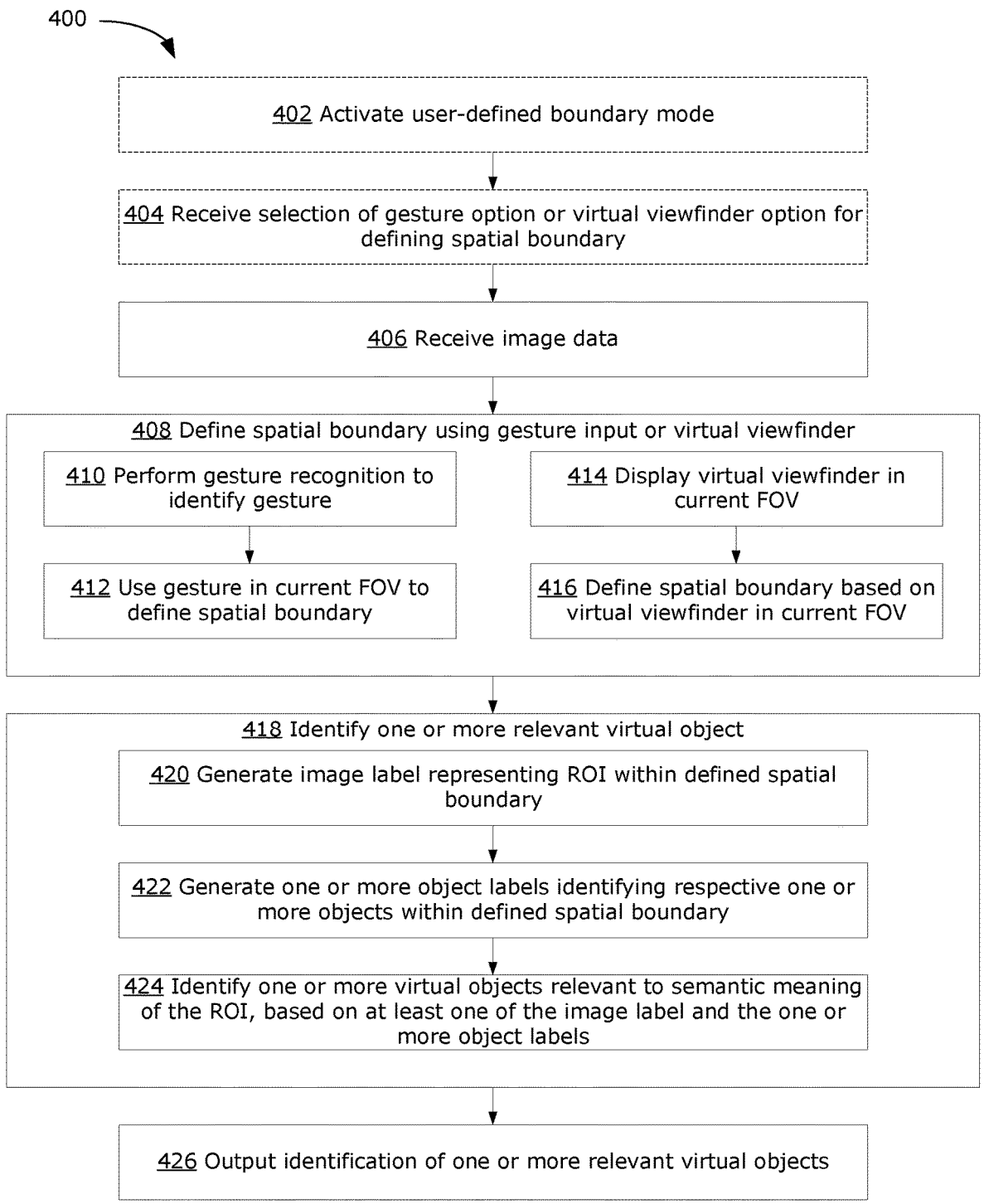
FIG. 4 is a flowchart illustrating an example method for identifying a virtual object to be rendered in an XR environment, in accordance with examples of the present disclosure.

FIG. 4 is a flowchart illustrating an example method 400, which may be performed by the electronic device 100 using the user interaction system 300 (e.g., by the processing unit 202 executing instructions in the memory 208 for implementing functions of the user interaction system 300). FIG. 4 may enable the electronic device 100 to define a spatial boundary in an XR environment and to recommend virtual objects relevant to the ROI within the spatial boundary.

Optionally, at 402, the method 400 may start with activating the user-defined spatial boundary mode on the electronic device 100. For example, user input (e.g., pressing a button, providing verbal commands, using a predefined gesture, etc.) may be received by the electronic device 100, to cause the user interaction system 300 to be used to define a spatial boundary. In some examples, a user interface (UI) may be displayed to indicate to the user how the spatial boundary may be defined. For example, the UI may allow for selection of an option to use gestures (e.g., static or dynamic hand gestures, or touch gestures) or an option to use a virtual viewfinder to define the spatial boundary. An example UI is described further below.

Optionally, at 404, the electronic device 100 may receive (e.g., via user interaction with the UI) selection of the gesture option or virtual viewfinder option for defining the spatial boundary. Depending on the selected option, the spatial boundary may be defined using the gesture recognition subsystem 312 or the virtual viewfinder subsystem 314. In some examples, only the gesture option or only the virtual viewfinder option may be supported by the electronic device, and step 404 may be omitted.

At 406, image data is received from the camera 106 of the electronic device 100. The image data captures a current FOV of the XR environment 20. The image data may, for example, be one or more frames of a live video image captured by the camera 106. As previously mentioned, additional sensor data, such as touch sensor data, may also be received, depending on the manner of user interaction used to define the spatial boundary.

At 408, the spatial boundary is defined using a gesture input or a virtual viewfinder. For example, the spatial boundary subsystem 310 may be used to perform step 408. Step 408 may be performed using steps 410-412 or using steps 414-416, depending on the optional selection at step 404 or depending on which option is supported by the electronic device 100. Steps 410-412 are performed to define the spatial boundary using gesture input, and steps 414-416 are performed to define the spatial boundary using the virtual viewfinder.

Steps 410-412 are described first. For example, the gesture recognition subsystem 312 may be used.

At 410, gesture recognition is performed on the image data to identify gesture. A gesture may be a hand gesture or a touch gesture. For example, the gesture recognition subsystem 312 may use any suitable gesture recognition or machine vision algorithm to detect and classify a static or dynamic hand gesture. In another example, the gesture recognition subsystem 312 may process touch sensor data to detect a touch gesture.

For example, a static hand gesture may be detected and recognized (from a set of predefined gestures) from a single frame (or a few consecutive frames) of live image data. In another example, a dynamic hand gesture may be detected and recognized (from a set of predefined gestures) from a video segment (or a sequence of frames) of live image data. For example, the image data may capture a hand drawing a shape (from a set of predefined shapes), which is recognized as a dynamic gesture. In another example, a touch gesture may be detected using touch sensor data that tracks touch input drawing a shape (from a set of predefined shapes).

At 412, the identified gesture is used to define a spatial boundary in the current FOV represented in the image data. For example, the gesture identified from the static hand gesture, dynamic hand gesture, or touch gesture is mapped to a boundary shape from a set of predefined shapes. The spatial boundary is defined in the frame of reference of the current FOV.

Steps 414-416 are now described. For example, the virtual viewfinder subsystem 314 may be used.

At 414, a virtual viewfinder is displayed in the current FOV. The shape of the virtual viewfinder may be selectable by a user (e.g., using a UI) from a set of predefined shapes. The virtual viewfinder is displayed as a virtual shape within the FOV. The user may have an option to modify the size and/or location of the virtual viewfinder in the FOV. The size, shape and location of the virtual viewfinder represents the shape that will be used to define the spatial boundary, and the portion of the FOV enclosed by the virtual viewfinder will be ROI within the defined spatial boundary. The portion of the FOV outside of the virtual viewfinder may be blurred out or faded out, for example, to draw the user's focus to the virtual viewfinder.

At 416, the spatial boundary is defined based on the virtual viewfinder in the current FOV. For example, the spatial boundary may be defined based on the location, shape and size of the virtual viewfinder, using the frame of reference of the current FOV. For example, the user may provide input to set or confirm that the virtual viewfinder in the current FOV should be used as the spatial boundary.

Regardless of how step 408 is performed (e.g., using steps 410-412 or using steps 414-416), the spatial boundary is defined in the current FOV. Optionally, prior to proceeding to step 418, the defined spatial boundary may be displayed to the user in the current FOV. The user may be provided with an option to modify (e.g., resize, reshape, rotate, etc.) or redo the spatial boundary. Step 418 follows step 408.

At 418, one or more relevant virtual objects are identified. For example, the virtual object recommendation subsystem 320 may be used to perform step 418. A relevant virtual object may be identified based on relevance to the semantic meaning of the ROI within the defined spatial boundary. Step 418 may be performed using steps 420-424.

At 420, an image label representing the ROI in the defined spatial boundary is generated. For example, the image classifier subsystem 322 may be used to perform step 420. The image label may represent the overall scene or environment in the ROI.

At 422, one or more object labels identifying respective one or more objects in the ROI are generated. For example, the object recognition subsystem 324 may be used to perform step 422. The identified object(s) may include virtual objects as well as non-virtual objects. The object label may represent the object class for the object in the ROI.

At 424, one or more virtual objects relevant to the semantic meaning of the ROI are identified. The semantic meaning of the ROI may be determined based on the image label and/or the object label(s). For example, a NLP algorithm may be used to generate semantically relevant object labels (e.g., that are semantically related to the image label and/or the object label(s)), and relevant virtual object(s) may be identified by querying a digital library for virtual objects having relevant object labels.

In an example, if a human wrist is identified and labeled in the ROI, a virtual object that is relevant to the semantic meaning of the ROI may be a virtual wristwatch showing the current time. In another example, if a window is identified and labeled in the ROI, a virtual object that is relevant to the semantic meaning of the ROI may be a virtual scenery that can be viewed through the window. In another example, if a display screen or frame is identified and labeled in the ROI, a virtual object that is relevant to the semantic meaning of the ROI may be a video object that can be played within the screen or frame. The identified virtual object(s) may include static images, dynamic images (including videos or moving objects), 2D virtual objects, 3D virtual objects, text objects, or sound objects, among other possibilities.

At 426, identification of the relevant virtual object(s) are outputted. For example, the identification of relevant virtual object(s) may be outputted to be displayed for selection by the user (e.g., using a UI). If there is a plurality of relevant virtual objects identified, the identification of the relevant virtual objects may be ranked or ordered according to how relevant each virtual object is to the semantic meaning of the ROI. The degree of relevance may be determined and ranked using, for example NLP algorithms. For example, a virtual object that is more specific to the semantic meaning of the ROI may be ranked higher than another virtual object that is more general (but that is still relevant to the semantic meaning of the ROI). For example, if the image label of the ROI is "room" and an object label is "bed", a more specific relevant virtual object may be a virtual pillow that can be rendered as a virtual overlay for the identified bed object, and a more general relevant virtual object may be a virtual cat that can be rendered as a virtual overlay for the bed object. In this example, a virtual pillow may be ranked higher and considered to be more relevant to the semantic meaning of the ROI compared to a virtual cat, because a pillow is more specific to a bed whereas a cat might be relevant to a large variety of non-bed objects.

The user may select one or more recommended relevant virtual object(s) to be overlaid into the XR environment 20. Alternatively, the user may select any other virtual object from the digital library. After the selection of a virtual object (e.g., via user interaction with the UI), the selected virtual object may be rendered in the ROI defined by the spatial boundary.

The method 400 may return to step 406 to enable definition of a new spatial boundary. The virtual object that has been selected to be rendered in the previously-defined spatial boundary may continue to be rendered when the new spatial boundary is defined, or may be erased when the new spatial boundary is defined.

Figure 5C:
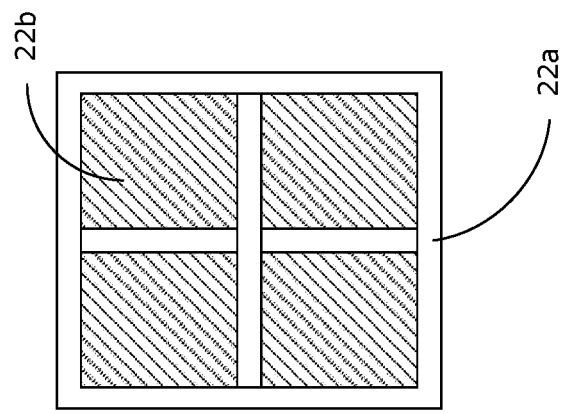
FIGS. 5A-C illustrate an example static hand gesture that may be used to define a spatial boundary in an XR environment, in accordance with examples of the present disclosure.
Figure 5B:
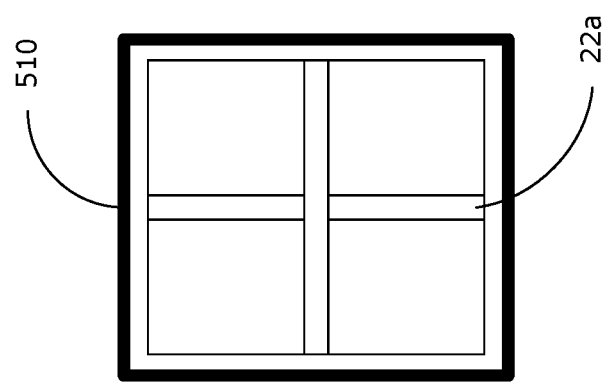
Figure 5A:
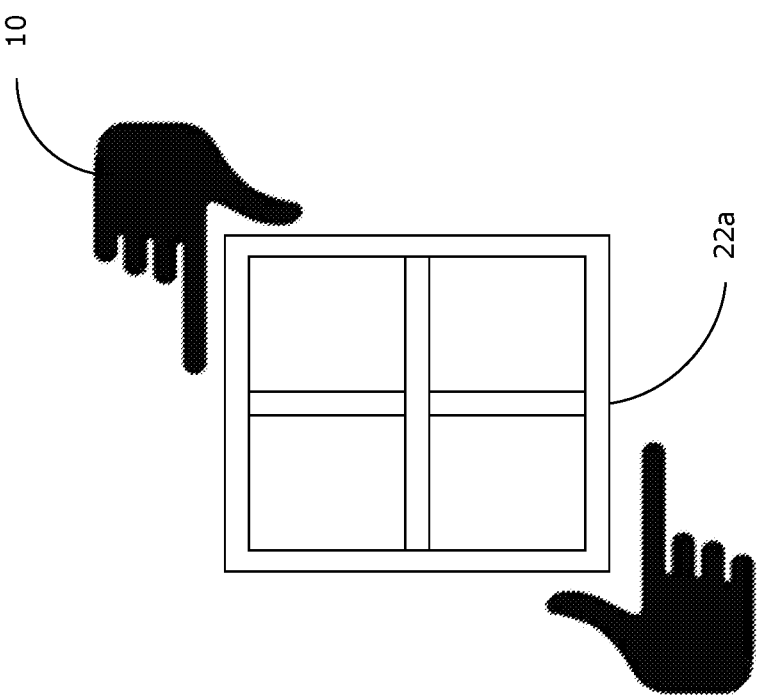

FIGS. 5A-5C illustrates an example implementation of the method 400 in the XR environment 20, in which a static hand gesture is used to define the spatial boundary.

FIG. 5A illustrates an example static hand gesture performed by a user 10 in the current FOV. In this example, the static hand gesture is a gesture performed using two hands to frame a rectangular shape. This static hand gesture is recognized and is used to define a rectangular spatial boundary 510, as shown in FIG. 5B, including a non-virtual object 22a (in this case, a window). Image classification and object detection are performed in the ROI within the spatial boundary 510. In this example, image classification may generate an image label representing the window, and object detection may generate object labels for objects viewed through the window (e.g., clouds, houses, cars, etc.). Based on the image label and object label(s) one or more relevant virtual objects (e.g., scenery, airplane, bird, etc.) are identified and presented for user selection. FIG. 5C is a simplified illustration of an example virtual object 22b (in this example, a scenery object that fills up the view from the window) that is rendered in the FOV.

Figure 6C:
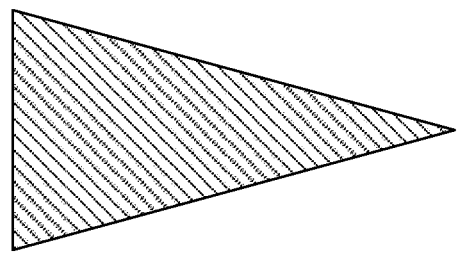
FIGS. 6A-C illustrate an example dynamic hand gesture that may be used to define a spatial boundary in an XR environment, in accordance with examples of the present disclosure.
Figure 6B:
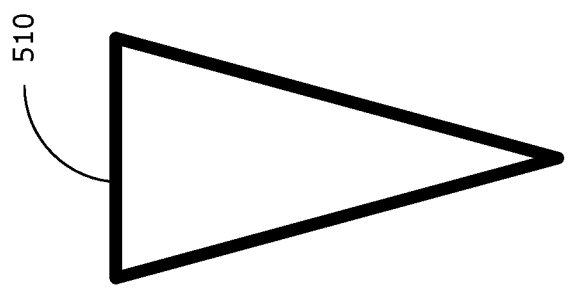
Figure 6A:
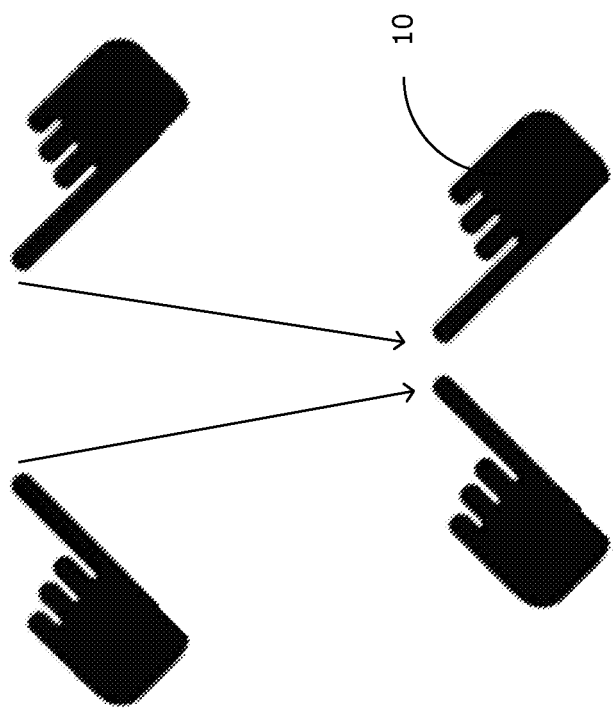

FIGS. 6A-6C illustrates an example implementation of the method 400 in the XR environment 20, in which a dynamic hand gesture is used to define the spatial boundary.

FIG. 6A illustrates an example dynamic hand gesture performed by a user 10 in the current FOV. In this example, the dynamic hand gesture is a gesture performed using two hands to draw a triangular shape. This dynamic hand gesture is recognized and is used to define a triangular spatial boundary 510, as shown in FIG. 6B. Image classification and object detection are performed in the ROI within the spatial boundary 510. Based on the image label and object label(s) one or more relevant virtual objects are identified and presented for user selection. FIG. 6C is a simplified illustration of an example virtual object 22b (in this example, a scenery object that fills up the ROI) that is rendered in the FOV.

Figure 7C:
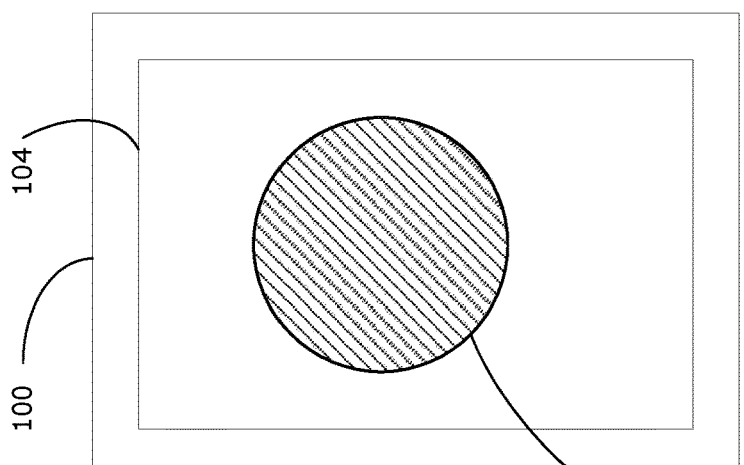
FIGS. 7A-C illustrate an example touch gesture that may be used to define a spatial boundary in an XR environment, in accordance with examples of the present disclosure.
Figure 7B:
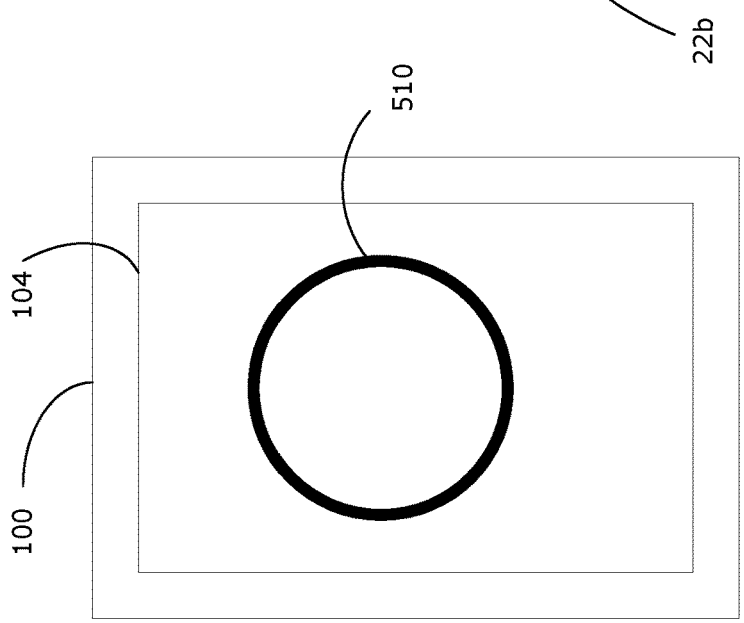
Figure 7A:
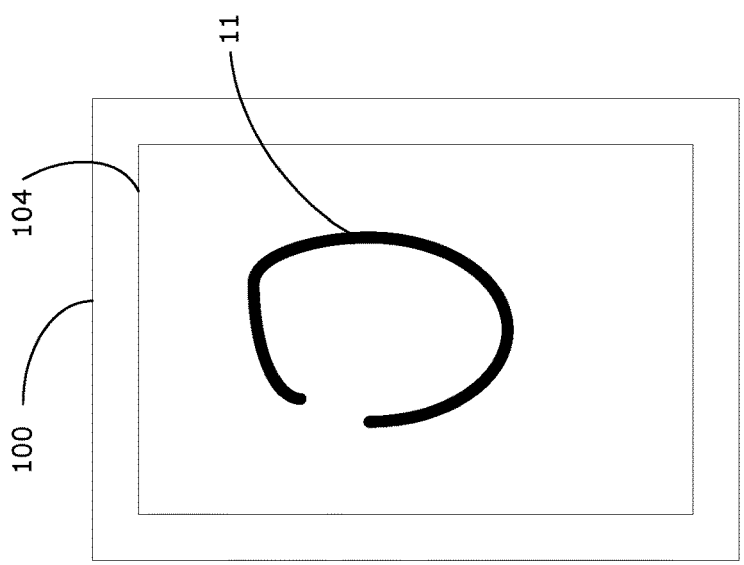

FIGS. 7A-7C illustrates an example implementation of the method 400 in the XR environment 20, in which a touch gesture is used to define the spatial boundary.

FIG. 7A illustrates the electronic device 100 with a current FOV shown in the display 104. A touch gesture 11 is drawn on the touchscreen display 104. In this example, the touch gesture draws a circular shape. This touch gesture is recognized and is used to define a circular spatial boundary 510, as shown in FIG. 7B. The spatial boundary 510 may not exactly match the path traversed by the touch gesture. For example, if the touch gesture does not draw a closed shape, does not draw a regular shape, or does not draw a shape that is a predefined shape, the gesture may be mapped to the most similar one of the predefined boundary shapes. Image classification and object detection are performed in the ROI within the spatial boundary 510. Based on the image label and object label(s) one or more relevant virtual objects are identified and presented for user selection. FIG. 7C is a simplified illustration of an example virtual object 22b (in this example, a scenery object that fills up the ROI) that is rendered in the FOV.

Figure 8C:
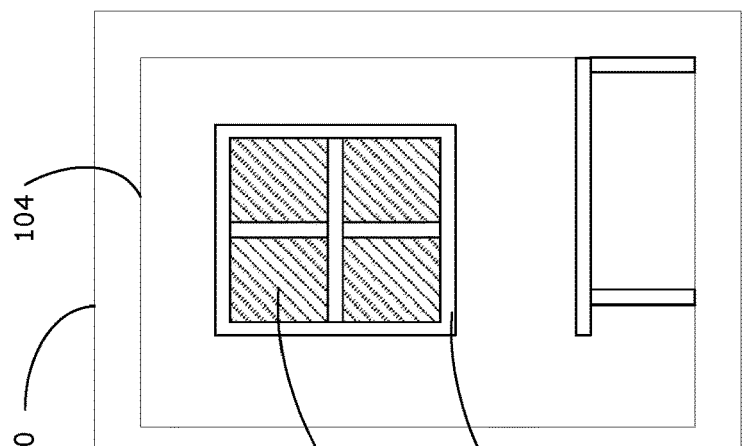
FIGS. 8A-C illustrate an example virtual viewfinder that may be used to define a spatial boundary in an XR environment, in accordance with examples of the present disclosure.
Figure 8B:
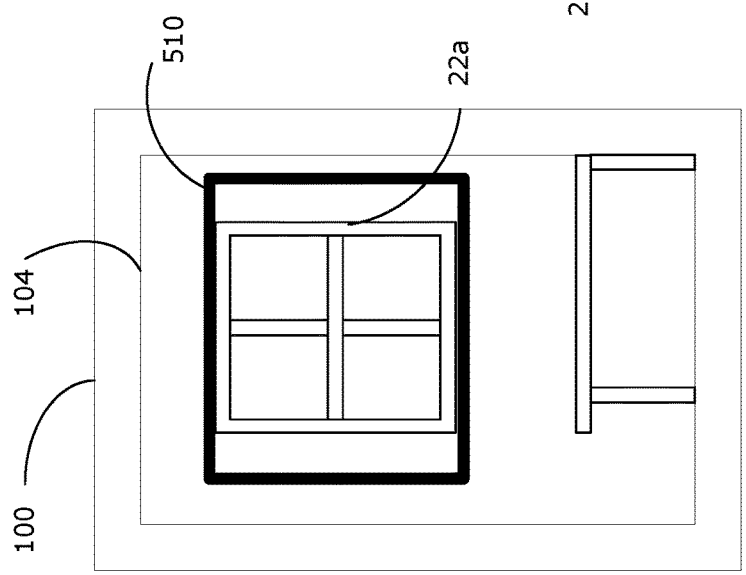
Figure 8A:
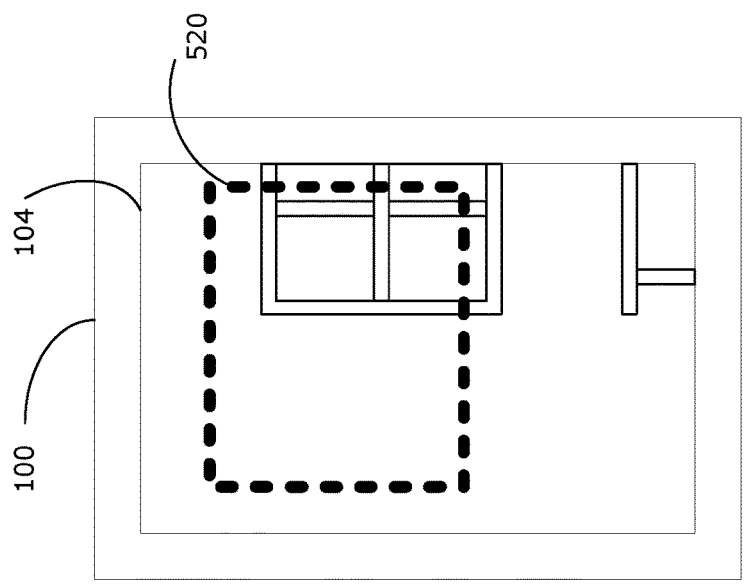

FIGS. 8A-8C illustrates an example implementation of the method 400 in the XR environment 20, in which a virtual viewfinder is used to define the spatial boundary.

FIG. 8A illustrates an example virtual viewfinder 520 displayed in the current FOV on the display 104 of the electronic device 100. In this example, the virtual viewfinder 520 has been selected to be a rectangular shape. The FOV may be changed (e.g., by moving the electronic device 100) to move the virtual viewfinder 520 in the XR environment. The user may provide input (e.g., pressing a button, providing touch input, etc.) to define the spatial boundary 510 using the virtual viewfinder 520 in the current FOV. In FIG. 8B, the electronic device 100 is moved to change the FOV (and hence the image and objects within the virtual viewfinder 520) until the desired non-virtual object 22a (in this case, a window) is within the virtual viewfinder 520, and the spatial boundary 510 is confirmed. Image classification and object detection are performed in the ROI within the spatial boundary 510. Based on the image label and object label(s) one or more relevant virtual objects are identified and presented for user selection. FIG. 8C is a simplified illustration of an example virtual object 22b (in this example, a scenery object that fills up the view from the window) that is rendered in the FOV.

The use of the virtual viewfinder 520 or the touch gesture 11 to define the spatial boundary 510 may be a more socially acceptable option (e.g., less likely to draw unwanted attention to the user) to define the spatial boundary, compared to the use of hand gestures. The use of the virtual viewfinder 520 or the touch gesture 11 may also be useful for practical implementation on handheld electronic devices or in other situations where the user has only one hand free to define the spatial boundary 510.

Figure 9:
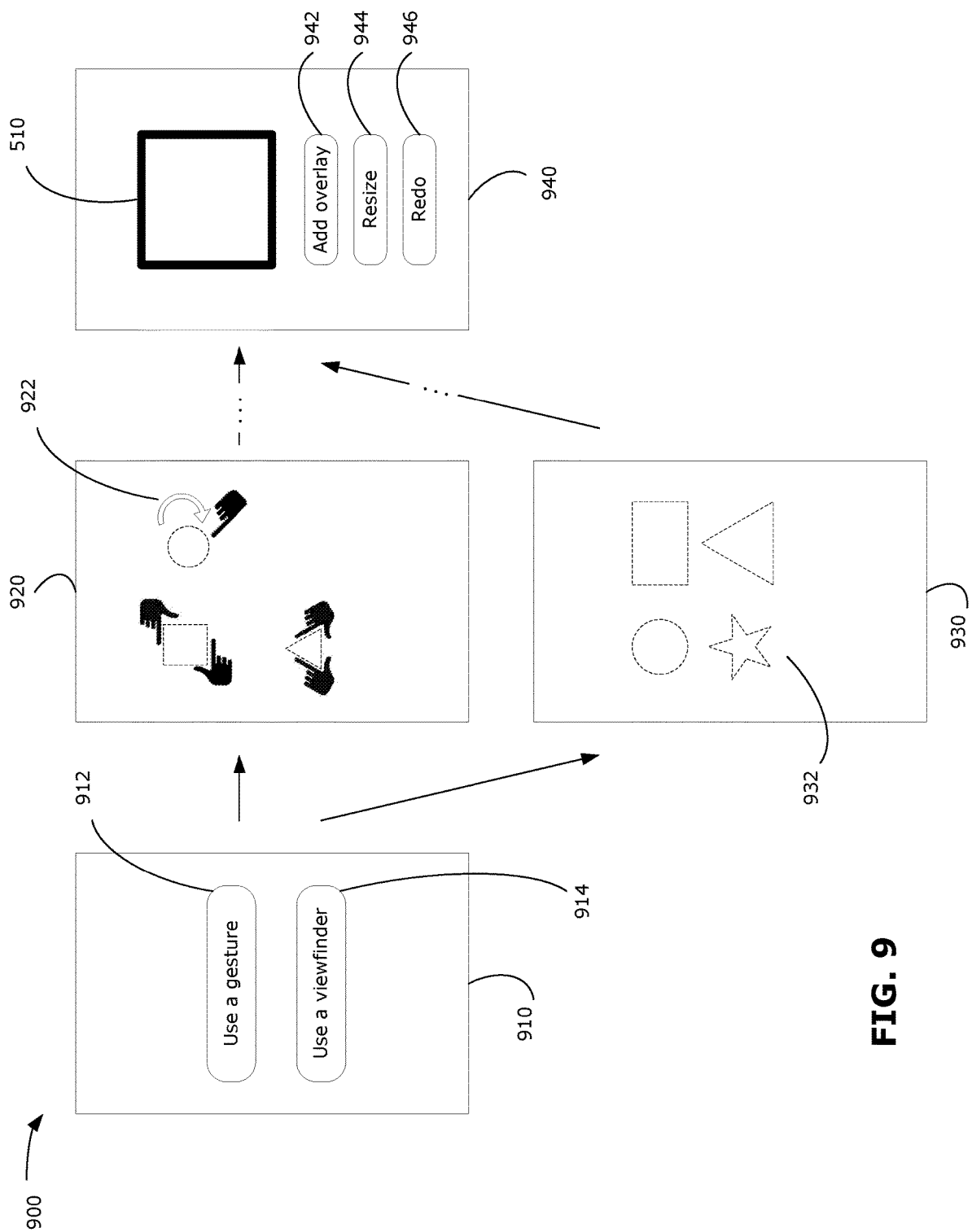
FIG. 9 illustrate an example user interface that may be used to define a spatial boundary in an XR environment, in accordance with examples of the present disclosure.

FIG. 9 illustrates an example UI 900 that may be presented on the display 104 of the electronic device 100, for example during the method 400. In this example, the UI 900 is illustrated as a plurality of view and transitions between views. The elements of the UI 900 (e.g., selectable options, diagrams, etc.) may be superimposed over the FOV captured by the camera 106 of the electronic device 100, for example the UI 900 may be rendered as a virtual object in the XR environment being experienced by the user. For simplicity, the FOV is not shown in FIG. 9. It should be understood that other UIs may be provided as part of the method 400.

The UI 900 may be invoked in response to a user activating the user-defined spatial boundary mode on the electronic device 100. In an example first view 910, the UI 900 provides a gesture option 912 and a viewfinder option 914. The user may select an option 912, 914 using any suitable input mechanism (e.g., button input, voice input, touch input, etc.). If the gesture option 912 is selected, the UI 900 transitions to an example second view 920. In the second view 920, the user is presented with diagrams 922 showing hand gestures that the user can use to define a spatial boundary. If the viewfinder option 914 is selected, the UI 900 transitions to an example third view 930. In the third view 930, the user is presented with selectable options 932 to select the shape of the virtual viewfinder.

Depending on the user's selection, the spatial boundary may be defined in the FOV (based on gesture input or virtual viewfinder, as discussed above). Eventually, the UI 900 transitions to an example fourth view 940. In the fourth view 940, the defined spatial boundary 510 is displayed over the FOV. The user may be provided with an overlay option 942, a resize option 944 and a redo option 946. Selection of the overlay option 942 may cause the UI 900 to present the user with one or more recommended virtual objects (e.g., as identified by the user interface system 300, as discussed above) that may be added as a virtual overlay in the FOV. Selection of the resize option 944 may enable the user to modify the defined spatial boundary. Selection of the redo option 946 may remove the currently defined spatial boundary 510 and return to the first view 910. For simplicity, further views of the UI 900, after selection of an option 942, 944, 946, are not illustrated.

In various examples, the present disclosure has described methods and systems that that enable a user to interact with an XR environment (e.g., an AR environment) more intuitively and/or more efficiently. The disclosed methods and systems may be used to support user interaction with an AR environment, a VR environment, or an MR environment, for example. The disclosed methods and systems may be implemented in any suitable electronic device, including wearable devices, handheld devices, and non-mobile devices.

The disclosed methods and systems may be used as a standalone application, or may be integrated into other XR applications (e.g., other AR content generation software applications, other VR gaming software applications, etc.). For example, the disclosed methods and systems may be integrated into social media applications to enable a user to generate AR content that may be shared over a social network. The disclosed methods and systems may also be used in technology, healthcare and/or industrial applications. For example, a user-defined spatial boundary may be used in a virtual training scenario, to identify to a trainee the recommended tool that should be used to service a part within the defined spatial boundary. Other such applications are considered by the present disclosure.

Although the present disclosure has illustrated and described certain example gestures, boundary shapes and UI, it should be understood that the present disclosure is not limited to such examples. Various gestures, boundary shapes and UIs may be used, for example depending on social acceptance (e.g., whether a hand gesture would likely be embarrassing for the user to perform in public), intuitiveness (e.g., whether a gesture or UI is similar to other gestures or UIs already commonly used in electronic devices), or the gesture recognition capabilities of the user interface system (e.g., depending on the development of more advanced hand gesture recognition algorithms).

Although the present disclosure has illustrated and described the spatial boundary as being defined using certain regular geometric shapes (e.g., rectangular shapes, triangular shapes, circular shapes, etc.), the present disclosure is not limited to such examples. The use of other regular or irregular shapes for defining the spatial boundary is also within the scope of the present disclosure. For example, a hand gesture or touch gesture that draws an irregular shape in the FOV may be recognized and used to define a spatial boundary corresponding to the irregular shape. Thus, references to a spatial boundary shape may encompass irregular shapes.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing unit (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for rendering a virtual overlay in an extended reality (XR) environment, the method comprising:
    obtaining image data representing a current field of view (FOV) in the XR environment;
    defining a first spatial boundary in the current FOV, based on a sequence of user inputs forming a dynamic gesture, wherein a path traversed by the dynamic gesture defines at least a portion of the first spatial boundary;
    generating an image label representing a region of interest (ROI) within the defined first spatial boundary;
    generating one or more object labels identifying respective one or more objects within the defined first spatial boundary;

identifying at least one relevant virtual object that is relevant to a semantic meaning of the ROI based on at least one of: the image label and the one or more object labels; and outputting identification of the at least one relevant virtual object to be renderable in the XR environment.

2. The method of claim 1, further comprising defining a second spatial boundary in the current FOV by:
displaying a virtual viewfinder in the current FOV, the virtual viewfinder representing a spatial boundary shape enclosing a portion of the current FOV; and
in response to user input confirming selection of the virtual viewfinder, defining the second spatial boundary in the current FOV using the virtual viewfinder.

3. The method of claim 1, wherein defining the first spatial boundary in the current FOV further comprises:
performing gesture recognition on the image data to identify a gesture input representing the dynamic gesture;
identifying a spatial boundary shape corresponding to the identified gesture input; and
defining the first spatial boundary in the current FOV using the identified spatial boundary shape.

4. The method of claim 3, wherein the image data comprises a sequence of frames, and wherein the gesture recognition is performed to identify a dynamic gesture input over a plurality of frames.

5. The method of claim 1, wherein defining the first spatial boundary in the current FOV further comprises:
receiving dynamic touch input;
identifying a spatial boundary shape corresponding to the dynamic touch input; and
defining the first spatial boundary in the current FOV using the identified spatial boundary shape.

6. The method of claim 5, wherein the spatial boundary shape is identified corresponding to a path travelled by the dynamic touch input.

7. The method of claim 1, further comprising:
rendering the at least one relevant virtual object in the ROI within the defined first spatial boundary.

8. The method of claim 1, wherein a plurality of relevant virtual objects is identified, the method further comprising:
receiving a selection of one relevant virtual object from the plurality of relevant virtual objects; and
rendering the one relevant virtual object in the ROI within the defined first spatial boundary.

9. The method of claim 8, wherein outputting the identification of the plurality of relevant virtual objects comprises ranking the plurality of relevant virtual objects based on relevance to the semantic meaning of the ROI.

10. An electronic device comprising:
a processing unit coupled to a memory storing machine-executable instructions thereon, wherein the instructions, when executed by the processing unit, cause the electronic device to:
obtain image data representing a current field of view (FOV) in the XR environment;
define a first spatial boundary in the current FOV, based on a sequence of user inputs forming a dynamic gesture, wherein a path traversed by the dynamic gesture defines at least a portion of the first spatial boundary;
generate an image label representing a region of interest (ROI) within the defined first spatial boundary;
generate one or more object labels identifying respective one or more objects within the defined first spatial boundary;

identify at least one relevant virtual object that is relevant to a semantic meaning of the ROI based on at least one of: the image label and the one or more object labels; and
output identification of the at least one relevant virtual object to be renderable in the XR environment.

11. The electronic device of claim 10, wherein the instructions cause the electronic device to define a second spatial boundary in the current FOV by:
displaying a virtual viewfinder in the current FOV, the virtual viewfinder representing a spatial boundary shape enclosing a portion of the current FOV; and
in response to user input confirming selection of the virtual viewfinder, defining the second spatial boundary in the current FOV using the virtual viewfinder.

12. The electronic device of claim 10, wherein the instructions cause the electronic device to further define the first spatial boundary in the current FOV by:
performing gesture recognition on the image data to identify a gesture input representing the dynamic gesture;
identifying a spatial boundary shape corresponding to the identified gesture input; and
defining the first spatial boundary in the current FOV using the identified spatial boundary shape.

13. The electronic device of claim 12, wherein the image data comprises a sequence of frames, and wherein the gesture recognition is performed to identify a dynamic gesture input over a plurality of frames.

14. The electronic device of claim 10, wherein the instructions cause the electronic device to define the first spatial boundary in the current FOV by:
receiving dynamic touch input;
identifying a spatial boundary shape corresponding to the dynamic touch input; and
defining the first spatial boundary in the current FOV using the identified spatial boundary shape.

15. The electronic device of claim 14, wherein the spatial boundary shape is identified corresponding to a path travelled by the dynamic touch input.

16. The electronic device of claim 10, wherein the instructions further cause the electronic device to:
render the at least one relevant virtual object in the ROI within the defined first spatial boundary.

17. The electronic device of claim 10, wherein the electronic device is one of:
a head-mounted display (HMD) device;
augmented reality (AR) glasses;
a wearable device; or
a handheld device.

18. A non-transitory computer-readable medium having machine-executable instructions stored thereon, the instructions, when executed by a processing unit of an electronic device, cause the electronic device to:
obtain image data representing a current field of view (FOV) in the XR environment;
define a first spatial boundary in the current FOV, based on a sequence of detected user inputs forming a dynamic gesture, wherein a path traversed by the dynamic gesture defines at least a portion of the first spatial boundary;
generate an image label representing a region of interest (ROI) within the defined first spatial boundary;
generate one or more object labels identifying respective one or more objects within the defined first spatial boundary;

identify at least one relevant virtual object that is relevant to a semantic meaning of the ROI based on at least one of: the image label and the one or more object labels; and output identification of the at least one relevant virtual object to be renderable in the XR environment.

\* \* \* \* \*